United States Patent [19]

Hayashi et al.

[11] Patent Number: 4,991,004
[45] Date of Patent: Feb. 5, 1991

[54] FILM PREVIEWER WHICH SIMULTANEOUSLY DISPLAYS A 110 AND A 135 FRAME

[75] Inventors: Ryoichi Hayashi; Yoshiaki Sakamoto, both of Tokyo, Japan

[73] Assignee: Fuji Photo Film Co., Ltd., Kanagawa, Japan

[21] Appl. No.: 305,599

[22] Filed: Feb. 3, 1989

[30] Foreign Application Priority Data

Feb. 5, 1988 [JP] Japan .................................. 63-25114
Feb. 5, 1988 [JP] Japan .................................. 63-25115

[51] Int. Cl.⁵ .............................................. H04N 1/40
[52] U.S. Cl. ...................................... 358/76; 358/450; 358/451
[58] Field of Search ................. 358/76, 451, 75, 214, 358/216, 450

[56] References Cited

U.S. PATENT DOCUMENTS

| | | | |
|---|---|---|---|
| 4,279,505 | 7/1981 | Ursprung et al. | 355/77 |
| 4,692,797 | 9/1987 | Matsumoto | 358/76 |
| 4,743,963 | 5/1988 | Abuyama | 358/76 X |
| 4,782,390 | 11/1988 | Hayashi et al. | 358/76 |
| 4,807,156 | 2/1989 | Parisi | 358/451 X |
| 4,809,305 | 2/1989 | Tabata et al. | 358/451 X |
| 4,814,894 | 3/1989 | Yoshida | 358/451 X |
| 4,833,544 | 5/1989 | Sato et al. | 358/451 |

FOREIGN PATENT DOCUMENTS

| | | |
|---|---|---|
| 0108158 | 11/1982 | European Pat. Off. |
| 0085351 | 1/1983 | European Pat. Off. |
| 141530 | 6/1987 | Japan . |
| 2177567 | 6/1986 | United Kingdom . |

Primary Examiner—James J. Groody
Assistant Examiner—Mark R. Powell
Attorney, Agent, or Firm—Sughrue, Mion, Zinn, Macpeak & Seas

[57] ABSTRACT

Picture frames on a color photographic film are detected with a television camera, and the color images of the picture frames are displayed in a matrix arrangement on a color monitor. In order to display color images of picture frames at the same dimension on the color display irrespective of the picture frame size of the color photographic film, a specific area from which pixels are picked up is determined in accordance with the picture frame size, and pixel thinning is performed. Pixels for an image taken as a full size on the 135 type color photographic film are thinned by removing every second pixel in both the vertical and horizontal directions, and pixels for an image taken as a half size on the 135 type color photographic film are thinned by removing every second pixel in the vertical direction within the specific area, and interchanging the vertical and horizontal addresses to read the image data rotated by 90 degrees. Pixels for an image of a 110 type color photographic film all are picked from the specific area as the image data.

8 Claims, 5 Drawing Sheets

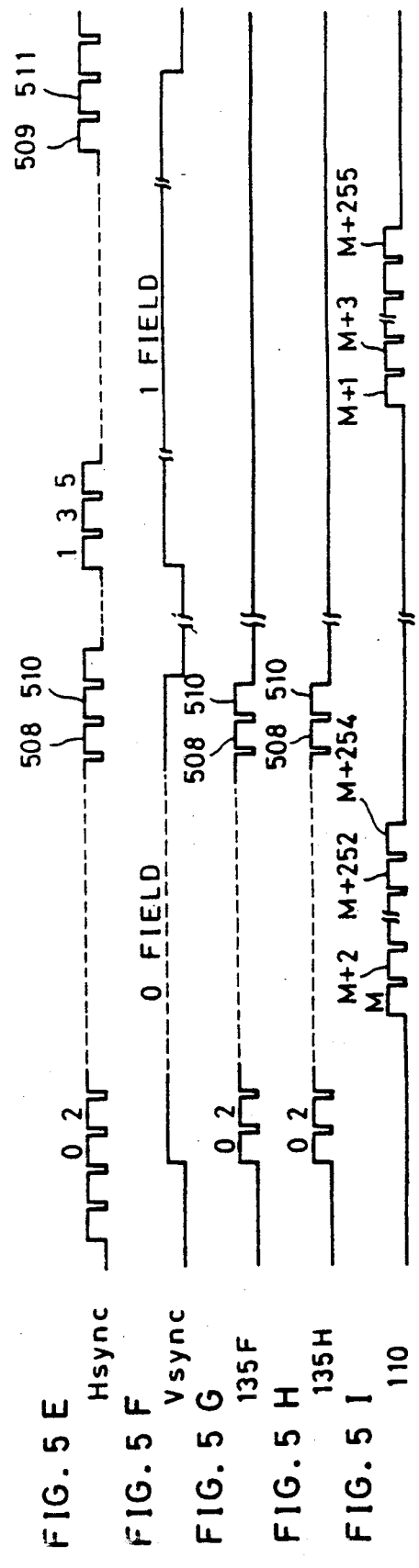

FILM PREVIEWER WHICH SIMULTANEOUSLY DISPLAYS A 110 AND A 135 FRAME

BACKGROUND OF THE INVENTION

The present invention relates to a method and apparatus for displaying, on an image display unit, picture frames of color photographic films taken with a television camera. More particularly, the present invention relates to a method and apparatus for displaying picture frames of various sizes at the same dimension on an image display unit, by thinning pixels based on the size of a frame, and writing the thinned image data in an image memory.

A video type color film analyzer estimates the quality of a color image within a picture frame of a color photographic film using an image display system, prior to printing it out. Each picture frame of a color photographic film is taken with a television (TV) camera and the pixel image data are stored in an image memory. The image data read out from the image memory are processed and therefore are displayed on an image display unit, such as a color CRT, in the form of a color positive image. An operator checks the image displayed on the color CRT to see whether a finished print thereof would be acceptable. If not, the operator empirically determines exposure correction data according to which the exposure light amount is set and the picture frame is printed.

According to known picture frame display arrangements, a plurality of color CRTs are arranged in a line to display one color picture image per one color CRT as disclosed, e.g., in Japanese Patent Laid Open Publication No. 62-141530, or a plurality of color picture images are displayed in a matrix pattern on one color CRT as disclosed, e.g., in European Unexamined Patent Publication No. 0108158.

The TV camera of the above-mentioned known color film analyzer has its optical magnification factor adjusted such that a full-size color picture image of a 135 type photographic film (35 mm photographic film within a patrone) is displayed on the whole effective display or image pickup area. Such a fixed magnification factor has been used because most amateurs use 135 type photographic films (hereinafter simply called "135 F"). As a result, if a 135 type half size color photographic film (hereinafter simply called "135 H") or a 110 type color photographic film (hereinafter simply called "110 type"), both having a frame size smaller than that of "135 F" is used, the image of a color picture frame is displayed at a reduced size on the color CRT, resulting in a difficulty of inspecting a color image, inefficient use of the image memory, and reduced effective display area of the color CRT.

Adjusting an image size (changing a magnification) generally is performed by means of an optical system such as a zoom lens. Such an optical magnification change necessitates the use of a zoom lens, a pulse motor, a lens position detector and the like, resulting in poor cost effectiveness in spite of size standardization of color photographic films and a small number of types.

SUMMARY OF THE INVENTION

In view of the foregoing, it is an object of the present invention to provide a method and apparatus for displaying picture frames of a color photographic film at the same dimension on an image display unit, by electrically changing magnification when writing picture image data in an image memory.

The above and other objects and advantages of the present invention can be achieved as follows. A picture frame of a color photographic film is taken with a TV camera. The image data of pixels of the picture frame are stored in an image memory such that all the pixels within the predetermined portion of the image pickup area of the TV camera are stored for a small picture image, whereas the pixels are thinned by removing one pixel out of every predetermined number of pixels for a large picture image.

Almost all of photographic films brought to laboratories are "135 F", "135 H" and "110 type". According to a preferred embodiment of this invention, all the pixel image data within a predetermined portion of the image pickup area are stored as image data for "110 type", whereas the pixels within the image pickup area are thinned by removing one pixel out of every predetermined number of pixels for "135 F" type film, and the thinned image data are stored. For "135 H" type film, the pixels are thinned by removing one pixel out of every predetermined number of pixels in the vertical direction, the picture frame is rotated by 90 degrees by interchanging the horizontal and vertical addresses, and the resultant pixel image data are stored.

The greater the degree of thinning of the pixels, the greater the degree of deterioration of resolution of a color image displayed on an image display unit. To mitigate lowering of resolution and to use the same number of pixels for both 135 type and 110 type films, the latter being next most popular, it is preferable to thin pixels by a factor of ½ for "135 F" and "135 H" type film. It is also preferable that the pixel image data of a picture frame for "135 H" type film thinned in the vertical direction be temporarily stored in a buffer memory and thereafter, that the addresses be interchanged between the horizontal and vertical directions to read the pixel image data from the buffer memory and store the read-out image data in an image memory.

According to the present invention, the magnification change is electrically performed such that the same number of pixels are stored for each of a number of differently-sized picture frames. Therefore, the magnification change can be conducted readily to display a picture frame different in size at the same dimension on an image display unit. In addition, it becomes possible to efficiently use the image memory and image display unit.

BRIEF DESCRIPTION OF THE DRAWINGS

The foregoing and other objects of the present invention will be seen by reference to the following detailed description, taken in connection with the accompanying drawings, in which:

FIGS. 5A to 5I are timing charts for explaining the pixel writing operation;

DETAILED DESCRIPTION OF THE PREFERRED EMBODIMENT

Figure 1:
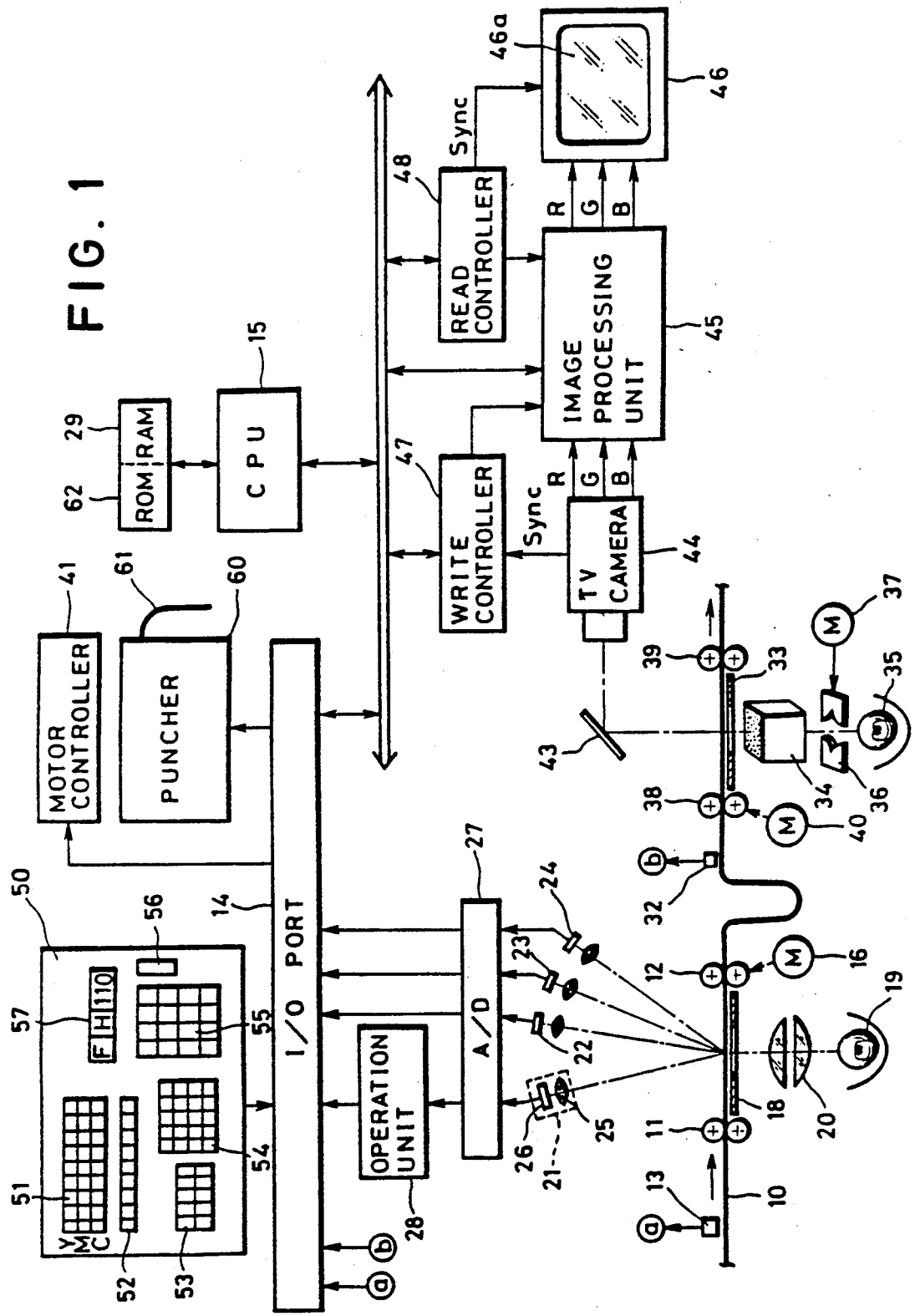
FIG. 1 is a schematic diagram showing an embodiment of a color film analyzer according to the present invention.

FIG. 1 schematically shows the color film analyzer according to this invention. An elongated film 10 is made of a plurality of color photographic films, such as color negative films, bonded together with a splicing tape. Each of the color negative films has a plurality of color negative picture frames. A notch is formed for each picture frame near a center line thereof. The elongated film 10 is nipped with two sets of feed rollers 11 and 12 and is transported in the direction indicated by an arrow.

During transportation, a notch sensor 13 detects each notch and supplies a detection signal to a CPU 15 via an I/O port 14. With a given distance between the notch sensor 13 and a measuring station, it is possible to transfer a particular picture frame correctly to the measuring station by moving the elongated film 10 for a predetermined time after detecting the notch. The predetermined time may be obtained by counting drive pulses of a pulse motor 16 which drives the feed roller pairs 11 and 12. Instead of detecting a notch the image within a picture frame may be detected to transport a particular picture frame correctly to the measuring station.

A film mask 18 is mounted at the measuring station. A picture frame positioned at the film mask is irradiated with light from a lamp 19 and converged by two condenser lenses 20. The irradiated picture frame is measured with a scanner 21, and sensors 22, 23 and 24 for red, green and blue colors, respectively. The scanner 21 is constructed of a lens 25 and image area sensor 26 for photoelectric conversion of a image focussed onto the photosensitive region to output therefrom a time sequential signal. The time sequential signal is converted into a digital signal by an A/D converter 27 to supply it to an operation unit 28 constructed of an 8 bit microcomputer.

The operation unit 28 logarithmically converts the measured pixel light data to obtain density values which are written in a memory. After this write operation, the density values for pixels within a predetermined area are read to obtain an arithmetic mean value thereof. A plurality of mean density values for predetermined areas such as the central area of a picture frame, upper and lower areas and the like, are obtained. The distribution of the plurality of mean density values is used to identify a pattern classification. An operation formula prepared for each pattern classification is used to calculate a density correction value (color correction value common to three colors) which is stored in RAM 29.

The red green and blue sensors 22 23 and 24 are used to measure a large area transmittance density (LATD) of a picture frame at the measuring station, a lens being mounted in front of each sensor. Signals outputted from the sensors 22 to 24 are converted into digital signals by the A/D converter 27. The digital signals are supplied to the CPU 15 via the I/O port 14 for calculation of color correction values and ND filter values for the three colors which are written in RAM 29.

A picture frame at the measuring station then is transported to an image pickup station, a film loop being interposed therebetween as a buffer. A notch sensor 32 is mounted upstream of the image pickup station to transport a picture frame correctly to the image pickup station. A film mask 33 is mounted at the image pickup station. A picture frame positioned within the film mask 33 is irradiated with light from a lamp 35 and is diffused by a mixing box 34. Between the mixing box 34 and the lamp 35, there are disposed two ND filters 36 which are driven by a pulse motor 37 in opposite directions in a plane perpendicular to the optical path. In the ordinary case, the ND filters 36 are inserted within the optical path at the normal position. They are retracted from the optical path for an over-exposed picture frame, and are further inserted within the optical path for an under-exposed picture frame.

Figure 6:
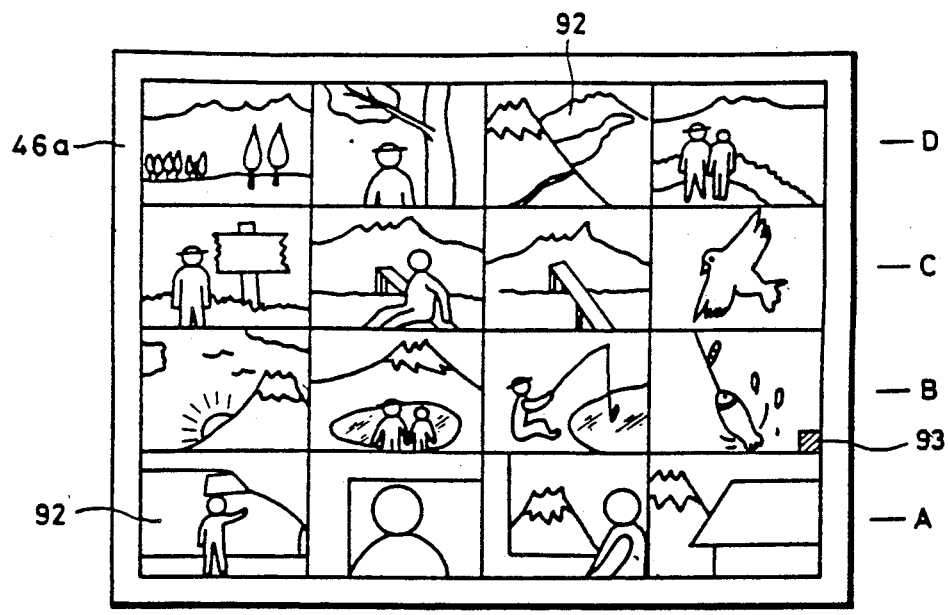
FIG. 6 shows the display state of picture frames for "135 F" type film on a color monitor.

Two sets of feed rollers 38 and 39 driven by a pulse motor 40 are mounted on opposite sides of the film mask 33. The rotation of the pulse motor 40 is controlled by a motor controller 41 for sequentially positioning picture frames with notches at the image pickup station. Light passed through a positioned picture frame is reflected by a mirror 43 and is taken with a TV camera 44 which generates red, green and blue color image signals R, G and B, a synchro signal SYNC, and a field signal F. The red, green and blue color image signals R, G and B are processed by an image processing unit 45 and are supplied to a color monitor 46. The color monitor 46, for example, a color CRT, displays a plurality of color images in a matrix arrangement on its screen 46a. Specifically, as shown in FIG. 6, the monitor 46 displays four picture frames on each of four lines A to D in the vertical direction. The color images on line A are the first that are inputted to the color monitor, and line D are the last inputted. A color image at the left hand side of a given line is the first inputted on that line.

A write controller 47, under control of the CPU 15, generates an address signal and the like based on the synchro signal SYNC and field signal F to control the write operation of image data to the image processing unit 45. A read controller 48, also under control of the CPU 15, generates an address signal for reading image data, a synchro signal to be supplied to the color monitor 46, and the like.

A keyboard 50 has color keys 51, density keys 52, operation keys 53, alphanumeric keys 54, picture frame designating keys 55, a next page key 56, and size designating keys 57. The color keys 51 include cyan keys for cyan correction, magenta keys formagenta correction, and yellow keys for yellow correction, respective rows of keys for the same color having a plurality of keys for stepwise color correction. The density keys 52 for density correction likewise are constructed of a plurality of keys arranged in a row for stepwise density correction. The operation keys 53 are used for indicating film inspection start, printing of correction data, and the like. The alphanumeric keys 54 are used for setting print conditions, inputting data and the like. The picture frame designating keys 55 for designating a picture frame to be corrected manually are constructed of 16 keys in one to-one correspondence with 16 picture frames. The next page key 56 is used to move the display on the color monitor 46 to the next page. The size designating keys 57 are used for inputting the picture frame size of a color photographic film. Since a DX code representative of the type of a color photographic film is printed on the side thereof, a DX sensor may be mounted on the passage of the elongated film 10 to automatically input the picture frame size. Discrimination between "135 F" and "135 H" type films may be conducted based on the interval between picture frames.

A puncher 60 is used after film inspection to record exposure correction data (color, density correction values) in a punch tape 61. ROM 62 stores therein fixed data such as print conditions, and programs for control of circuit operation.

Figure 2:
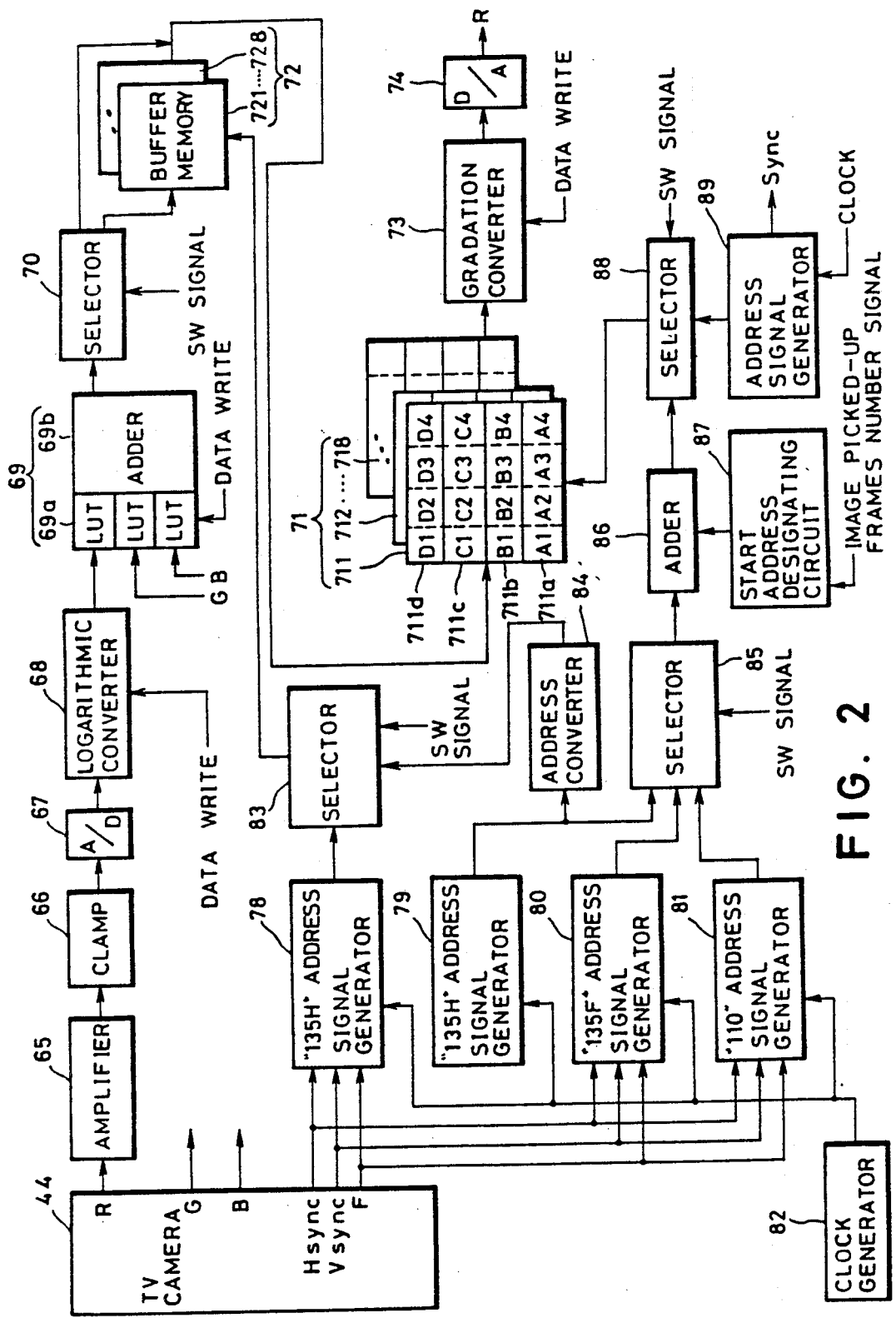
FIG. 2 is a block diagram showing an example of the image processing unit shown in FIG. 1.

FIG. 2 shows detail of the image processing unit 45, wherein only the red color image signal processing unit is shown because the other green and blue color image signal processing units have the same construction as that of the red color image signal processing unit. A red color image signal supplied from the TV camera 44 is amplified by an amplifier 65 and is sent to a clamp circuit 66 to establish a reference level. The red color image signal outputted from the clamp circuit 66 is converted into a digital signal by an A/D converter 67, and the digital signal is sent to a logarithmic converter 68 constructed of look-up table memories which logarithmically-convert an inputted signal to obtain image data proportional to the density value. The CPU 15 writes table data stored in ROM 62 to the logarithmic converter 68 prior to image pickup by the TV camera 44.

A chroma correction circuit 69 is used for correcting a difference between spectral sensitivities of the color paper used by a color printer and the image pickup area of the TV camera 44. The chroma correction circuit 69 is constructed of three look-up table memories 69a, for weighting three color image data, and an adder 69b, for adding together the outputs from the three look-up table memories 69a and outputting the result as red color image data. Prior to the start of film inspection, the CPU 15 reads three sets of coefficients stored in ROM 62 to change, in a stepwise manner, the read-out coefficients and to generate three types of table data for red color chroma correction, the table data being written in an associated one of the three look-up table memories 69a.

A selector 70 operates in response to a switching signal SW from the CPU 15 to send image data for "135 F" and "110 type" film 10 to the image memory 71, and for "135 H" film via a buffer memory 72 to the image memory 71. The buffer memory 72 is used to rotate an image of a picture frame by 90 degrees. One picture frame is composed of 256×256 pixels (64 K pixels in total), and the gradation of each pixel of each of the three primary colors is represented by 8 bits. Therefore, the buffer memory 72 is constructed of eight RAMs 721 to 728 each having a memory capacity of 64 K×1 bits.

An image memory 71 is constructed of a plurality of memory boards corresponding in number to the number of gradation levels, each memory card being constructed of four RAMs corresponding to four lines A to D on which color images are displayed in a matrix arrangement. In this embodiment, eight memory boards 711 to 718 are used, each memory board being constructed of four RAMs (256 K ×1 bits). RAM 711a has four memory areas A1 to A4, in each of which image data of a single picture frame are stored. The other RAMs 711b to 711d are similarly constructed, with memory areas given like reference characters and figures to those shown in FIG. 6. Each RAM may be constructed of four RAMs of 64 K×1 bits instead of 256 K×1 bits. An image memory having a capacity of two or more pages may be used to allow both read and write operations simultaneously, without intercepting film inspection while writing image data.

Image data read out from the image memory 71 are sent to a gradation converter circuit 73 in which the image data are subjected to negative-to-positive conversion and gradation conversion. The gradation converter circuit 73 is constructed of sixteen look-up table memories corresponding to sixteen picture frames. Table data stored in each look-up table memory are used for image processing. Table data are generated by changing reference table data in accordance with the results of the light measurements or by manually inputting correction values. The image data of a picture frame which has undergone gradation conversion are sent to a D/A converter 74 and are converted into a red color analog signal which then is sent to the color monitor 46.

Four address signal generating circuits 78 to 81 are provided to write image data in the buffer memory 72 and the image memory 71. The address signal generating circuits 78 80 and 81 generate address signals in synchronization with an output of a video signal from the TV camera 44, using the synchro signals (H sync and V sync), the field signal outputted from the TV camera, and clock signals from a clock generator 82. In order to store temporarily image data for "135 H" film in the buffer memory 72, an address signal from the address signal generator 78 is sent to the buffer memory 72 via a selector 83. In transferring image data from the buffer memory 72 to the image memory 71, an address signal from the address signal generating circuit 79 is sent to an address converter circuit 84 which interchanges the horizontal address with the vertical address to rotate the picture frame by 90 degrees. The selector 83 selects address signals in accordance with the switching signal SW from the write controller 47.

A selector 85 under control of the write controller 47, selects one of three address signals outputted from the address signal generating circuits 79 to 81. The selected address signal is sent to an adder 86 and is added to a start address outputted from a start address designating circuit 87, the addition result being sent to the image memory 71 via a selector 88. The start address designating circuit 87 designates a memory area among the sixteen memory areas in which image data are to be written. The selector 88 selects either a write address signal outputted from the adder 86 or a read address signal outputted from an address signal generating circuit 89.

The film inspection operation now will be described. First, the already developed elongated film 10 is set at the analyzer. Then, in order to make the inspection conditions of the color film analyzer match the exposure conditions of the color printer, the alphanumeric keys 54 on the keyboard 50 are operated to designate a print channel corresponding to the color printer now in use. Next, the size designating key 57 is operated to designate the film size, e.g., "135 F".

Upon instruction of the start of film inspection, the elongated film 10 is transported in the direction indicated by the arrow. During transportation, a notch is detected with the notch sensor 13. The amount of film transportation is controlled based on the time when the notch is detected, in order to position the picture frame with the first notch at the measuring station. The picture frame at the measuring station then is irradiated with light from the lamp 19. Each point on the negative image within the picture frame is measured in sequence with the scanner 21. The LATD values for red, green and blue are measured by the LATD sensors 22 to 24. After measurement, the pulse motor 16 again is driven to transport the picture frame with the second notch to the measuring station to conduct the measurement. The picture frames with the third notch and following notches are measured similarly at the measuring station.

After measurement, the first picture frame is transported to the image pickup station, during which the notch sensor 32 detects the notch of the first picture frame. The rate of film transportation is controlled based on the time when the notch is detected, in order to position the first picture frame correctly at the image pickup station. In the time it takes to set the first picture frame at the image pickup station, it has been judged whether the picture frame is over-exposed or underexposed, based on the measurement results by the LATD sensors 22 to 24. For an over-exposed picture frame, the ND filters 36 are retracted from the optical path by driving the pulse motor 37 under control of CPU 15 to apply strong light from the lamp 35 to the picture frame. On the other hand for an under-exposed picture frame, the ND filters 36 are further inserted into the optical path to reduce the light intensity.

From the adjustment of the position of the ND filters 36 until the first picture frame is positioned at the image pickup station, the image of the first picture frame is ready for being taken with the TV camera immediately after the first picture frame reaches the image pickup station. Time sequential red, green and blue image signals outputted from the TV camera 44 are sent to the image processing unit 45 in which the signals undergo A/D conversion, chroma correction, storage, and gradation conversion. Specifically, as shown in FIG. 2, a red image signal is subjected to amplification and reference level clamping and thereafter, the signal is converted into red digital image data by the A/D converter. The red image data are made proportional to the density value by the logarithmic converter 68 and are sent to the chroma correction circuit 69. The chroma corrected red image data then are stored in the image memory 71 via the selector 70.

In synchronization with processing the red image, the address generating circuits 78 to 81 start operating. Since the color negative film now used by way of example is "135 F", an address signal from the address signal generating circuit 79 is selected by the selector 85 and is sent to the adder 86. During the image pickup of the first picture frame, the start address designating circuit 87 outputs an address representative of the origins of the first memory areas A1 of the memory boards 711 to 718. The address signal from the selector 85 and the origin address signal are added and are sent to the image memory 71 via the selector 88. Image data for one pixel for each color has 8 bits. Therefore, 8 bits of red image data are sequentially written in the eight memory boards 711 to 718 at the designated addresses. The following red image data are written into the image memory 71 via the selector 70. Green and blue image data are also written into the image memory 71 in a similar manner.

After writing the image data of the first picture frame, the pulse motor 40 again starts rotating to position the second picture frame at the image pickup station. The write controller 47 sends an image detected frame number signal to the start address designating circuit 87, which outputs the origin address signal representative of the second memory areas A2 of the memory boards 711 to 718.

Image data for 16 picture frames thus are sequentially taken with the TV camera 44 and are written into the image memory 71. After this, the read controller 48 sets the image memory 71 in a read mode. An address signal outputted from the address generating circuit 89 is selected by the selector 88 and is sent to the image memory 71. The image data written in the image memory 71 at the designated address are read and sent to the gradation converter circuit 73, which selects the look-up table corresponding to the picture frame now concerned and converts the image data in accordance with the table data stored therein. The table data stored in each look-up table differ for each picture frame, and are generated by shifting reference table data in accordance with the density correction value measured with the scanner 21 and the color correction values measured with the LATD sensors 22 to 24.

After gradation conversion, the image data are converted to an analog signal by the D/A converter 73. The obtained red image analog signal is sent to the color monitor 46. The green and blue image data are similarly read so that 16 color images 92 are displayed on the color monitor 45 as shown in FIG. 6. In reality, 16 color images 92 are separated from adjacent images with a white marginal frame interposed therebetween. An operator observes 16 frame color images 92 to judge if the images can be printed properly or not. For a color image which is considered not proper, the picture frame designating key 55 of the keyboard 50 is operated to designate such a picture frame. Upon such designation, a frame designating cursor 93 is displayed on the designated color image at a suitable position thereof. Next, the color key 51 or density key 52 is operated to input a correction value. Upon input of the correction value, the table data of the look-up table for gradation conversion of the designated picture frame are renewed. The image data are converted in accordance with the renewed table data so that the color image of the designated picture frame is corrected and displayed. If such correction still is insufficient, the color key 51 or density key 52 is again operated to correct the color image further.

If it is judged that all the picture frames will result in proper prints, then the next page key 56 is operated to conduct image pickup with the TV camera, simulation of printed images, and display of color images, to thus perform film inspection for 16 picture frames.

Upon completion of film inspection for all picture frames on the elongated film 10, the operation key 53 is operated so that the exposure correction data for respective picture frames stored in RAM 29 are recorded in the punch tape 61 using the puncher 88. The correction data includes correction data automatically calculated using the scanner 21 and correction data manually inputted by the operator. In printing frame pictures, the punch tape 61 is set at the printer to read therefrom the correction data which are added to the LATD value for each color measured with LATD sensor built in the printer, to determine the exposure amount for each color.

In the case where film inspection for "135 H" type film is performed, the size designating key 57 is operated first to input the film size. In this case, the image data read from a picture frame of "135 H" size are written in the buffer memory 72 at the area designated by the address signal from the address signal generating circuit 78. After writing the image data into the buffer memory 72, the address signal from the address signal generating circuit 79 is sent to the address converter circuit 84, in which the vertical address and horizontal address are interchanged. Using the interchanged addresses, the image data are read from the buffer memory and are written in the image memory 71 at the area designated by the address signal from the address designating circuit 79.

As above, in the case of "135 H" type film, the image data of each picture frame are written from the buffer memory 72 into the image memory 71. After writing image data for 16 picture frames, the image data are read from the image memory 71 and sent to the color monitor 46 which displays 16 color images in a matrix arrangement at the same dimension as that of "135 F". However, the vertical and horizontal addresses are switched for "135 H" so that the color images are rotated by 90 degrees and are turned sideways.

In the case where inspection for "110 type" color negative film is performed, the address signal generating circuit 81 is activated to designate the address of the image memory 71 in accordance with an address signal outputted from the address signal generating circuit 81. The image data read with the TV camera then are written into the image memory 71. Color images for "110 type" color negative film are displayed on the color monitor 46 at the same dimension and posture as those for "135 F" type film, as shown in FIG. 6.

Figure 7:
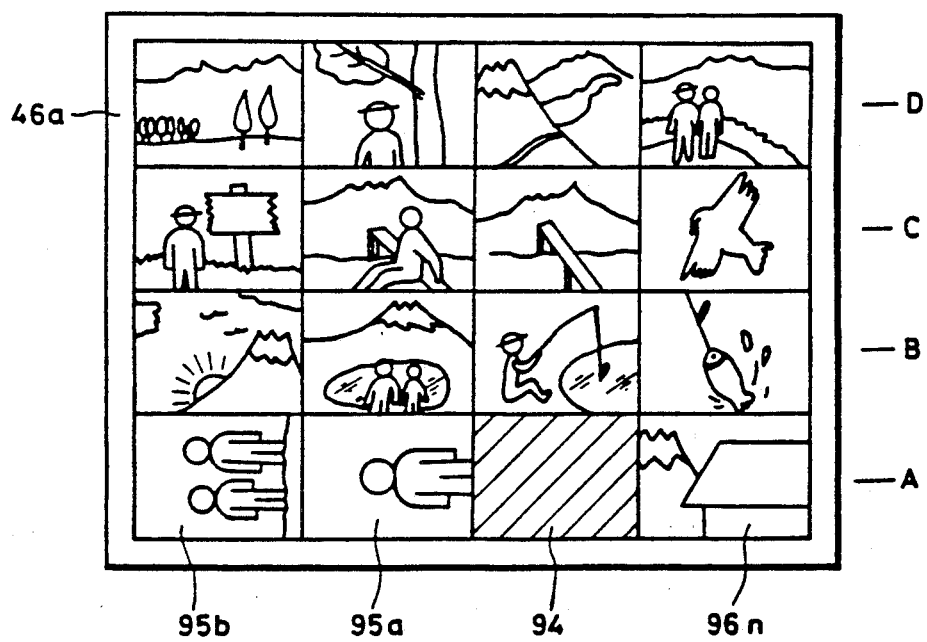
FIG. 7 shows the display state of picture frames for "135 F" and "135 H" type film on the color monitor.

The elongated film 10 sometimes may include, although to a lesser extent, "135 H" and "110 type" color negative films. FIG. 7 partially shows an example of elongated film 10 which has both a "135 F" color negative film and a "135 H" color negative film bonded to the "135 F" film using a splice tape. To show clearly the joint portion between two color negative films, the splice tape portion is displayed as a splice frame 94 on the color monitor. In FIG. 7, the color images 95a and 95b for the first two picture frames are displayed turned sideways, whereas the color image 96n for the last "135 F" picture frame is displayed at the right of the splice frame 94.

Next, the relationship between the effective image pickup area of a TV camera and the image memory will be described with reference to FIGS. 3 to 5. The effective image pickup area 100 (hereinafter simply called image pickup area) of the TV camera 44 has 512 scan lines in the vertical direction. The even number represent scan lines for 0 field and the odd number represents scan lines for 1 field (interlaced field). Sampling of image data is performed 512 times for each scan line. Therefore, image data for a picture frame have 512 pixels in both the vertical and horizontal directions. Image data for a picture frame accordingly is constructed of 256 K pixels.

The image memory 71 is composed of the image areas each constructed of 64 K bits for storage of 64 K pixels. For "135 H" type film, image data thinned in both the vertical and horizontal directions by removing every second pixel among 256 K pixels included in the image pickup area are written in the image memory 71. Specifically, the image data of 0 field, only as thinned by removing every second pixel in the horizontal direction, are used. This pixel thinning is performed using the address signal generating circuit 80. Therefore, image data of 64 K pixels, thinned in both the vertical and horizontal directions are stored in the image memory 71 as shown in FIG. 4A, wherein "X" represents the address in the horizontal direction, and "Y" represents the address in the vertical direction, and the "H" and "V" in the parentheses represent the directions on the image pickup area 100, as shown in FIG. 3.

Figure 3:
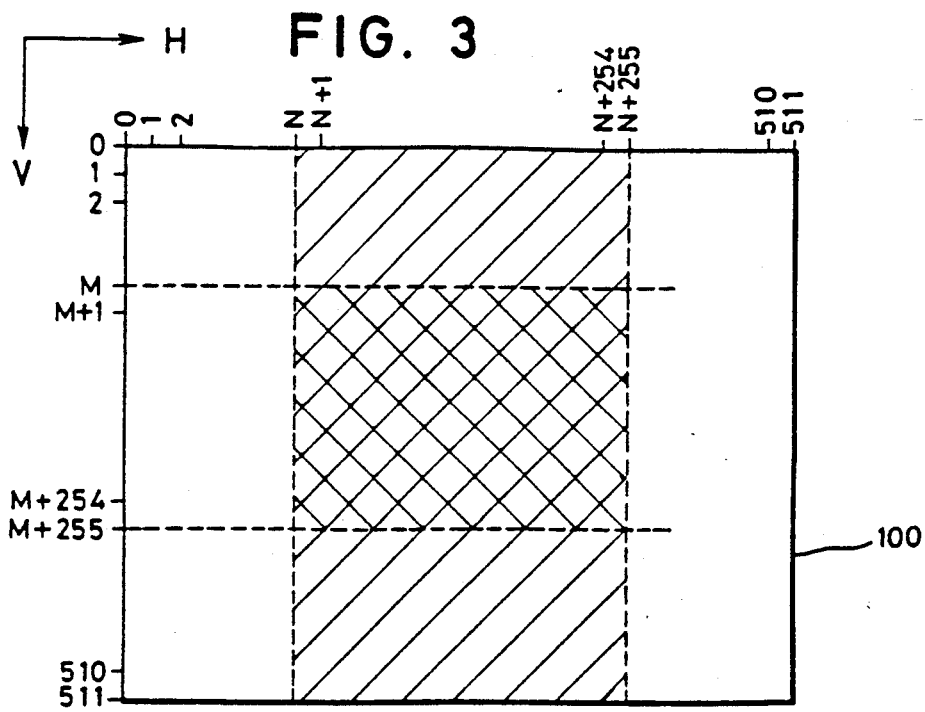
FIG. 3 is a diagram for explaining the relationship between the image pickup area and picture frame sizes.
Figure 4A:
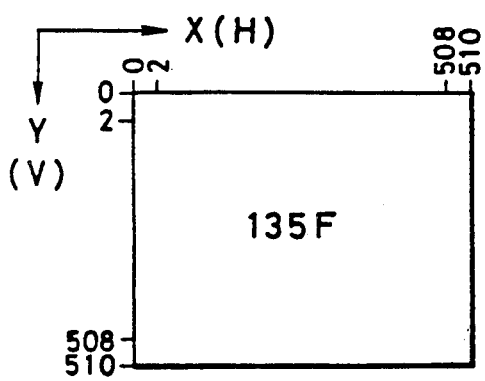
FIGS. 4A to 4C illustrate pixel layouts for "135 F", "135 H" and "110 type" picture frames written in image memories.
Figure 4C:
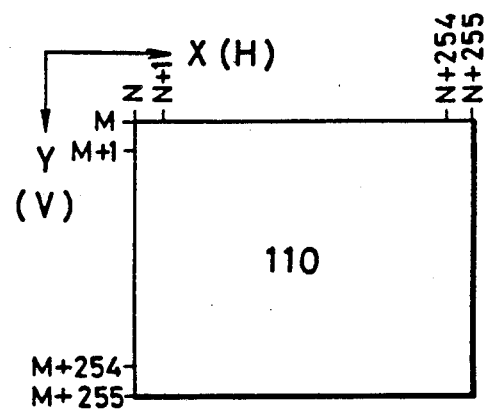

Since the optical magnification factor is fixed such that the image pickup area 100 of the TV camera 44 coincides with the picture frame size for "135 F" type film, the size of a picture frame of "135 H" type film becomes an area indicated by the hatched lines in FIG. 3. This hatching area starts from the N-th pixel to the (N+255)-th pixel in the horizontal direction. The address signal generating circuit 78 reads all the pixels, including the N-th to (N+255)-th pixels without thinning for both 0 and 1 fields, and writes them in the buffer memory 72. Since an image for "135 H" type film is a vertically elongated shape, the pixels are thinned in the vertical direction by a factor of ½. Thus 256 pixels in both the vertical and horizontal directions or a total of 64 K pixels, are read and written in the buffer memory 72.

Figure 4B:
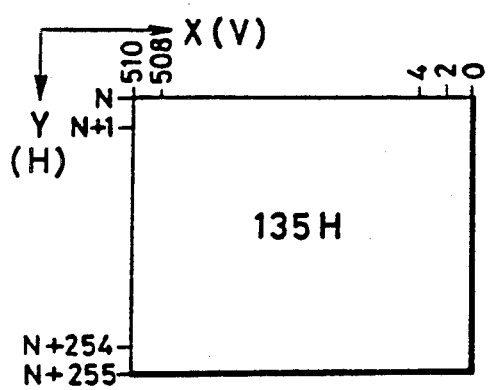

The image data written in the buffer memory 72 are read in accordance with the interchanged vertical and horizontal addresses, and are written in the image memory 71. The 64 K pixels of image data are written in the image memory 71 while being rotated by 90 degrees, as shown in FIG. 4B. Since the ratio of vertical and horizontal lengths of the color monitor 46 is 3:4, so that the image is displayed in a compressed state in the vertical direction. In view of this, it is preferable to thin pixels by removing every fifth pixel in the horizontal direction while writing the image data in the buffer memory 72.

The size of a picture frame from a "110 type" color negative film becomes as indicated by cross-hatching lines shown in FIG. 3. This cross-hatching area starts from N-th to (N+255)-th pixels in the horizontal direction and from M-th to (M+255)-th pixels in the vertical direction. Since the vertical and horizontal directions each have 256 pixels, the image data are written in the image memory 71 without performing pixel thinning.

As described above, pixels for "135 F" type film are thinned in both directions by a factor of ½ to make the total number of pixels equal to that for "110 type". Pixels for "135 H" type film are thinned in the vertical direction only, to make the total pixel number equal to that for "110 type" film. Accordingly, color images of picture frames for "135 F", "135 H" and "110 type" film all are displayed at the same dimension on the color monitor 46.

FIGS. 5A to 5I show timing charts to explain the operation for writing pixels, and shows timings for writing pixels for "135 F" and "110 type" film into the image memory 71 and for writing pixels for "135 H" type film into the buffer memory 72.

In the foregoing embodiment, a plurality of color images for picture frames are displayed in a matrix arrangement on the color monitor. However, the present invention also is applicable where a color image for a single picture frame is displayed on the color monitor at a magnified dimension. Further, reference images giving proper prints may be displayed at D line, for convenience of film inspection. Further, instead of a color CRT, a liquid crystal display or the like may be used as the color monitor.

While a preferred embodiment of the invention has been described using specific terms, such description is for illustrative purposes only. Changes and variations may be made without departing from the spirit or scope of the invention as defined by the appended claims which follow immediately.

What is claimed is:

1. A method of displaying images of a plurality of picture frames of a color photographic film on image display means, the images being picked up by image pickup means, the method comprising the steps of:

picking up image data for a picture frame of a 135 type color photographic film on which images have been taken in a full size format by removing every second pixel in both the vertical and horizontal directions, picking up image data for a picture frame of a 110 type color photographic film on which images have been taken by picking up all the pixels within a specific area of said image pickup area, and picking up image data for a picture frame of a half size format on said 135 type color photographic film by removing every second pixel in the vertical direction, and switching the vertical and horizontal addresses to read said image data rotated by 90 degrees;

writing said picked-up image data into an image memory;

reading said image data from said image memory;

supplying said read-out image data to said image display means; and displaying of the images of said plurality of picture frames in a matrix arrangement in accordance with said read-out image data.

2. A method according to claim 1, wherein said removal of pixels in the vertical and horizontal directions for said picture frame of said 135 type color photographic film and said removal of pixels in the vertical direction for said picture frame of a half size format on said 135 type color photographic film are performed during said writing step.

3. A method according to claim 1, wherein said image data with pixels thinned for said 135 half size picture frame are written in a buffer memory, and said image data are read by interchanging the vertical and horizontal addresses and are writing the data in said image memory.

4. An apparatus for displaying images of a plurality of color print frame of a color photographic film on image display means, and including image pickup means for picking up said image of a picture frame and an image memory for storing image data of pixels of said images of said plurality of picture frames, said apparatus further comprising:

means for picking up selected image data, including means for picking up image data for a picture frame of a 135 type color photographic film on which images have been taken in a full size format by removing every second pixel in both the vertical and horizontal directions, means for picking up image data for a picture frame of a 110 type color photographic film on which images have been taken by picking up all the pixels within a specific area of said image pickup area, and means for picking up image data for a picture frame of a half size format on said 135 type color film by removing every second pixel in the vertical direction, and switching the vertical and horizontal addresses to read said image data rotated by 90 degrees;

means for writing said picked-up image data into an image memory;

means for reading out said image data from said image memory;

means for processing said image data for simulation of said color print frames as said images; and means for displaying said images in matrix arrangement.

5. An apparatus according to claim 4, further comprising means for inputting the size of a picture frame.

6. An apparatus according to claim 4, wherein said image data with pixels thinned for said 135 half size picture frame are written in a buffer memory, and said image data are read by interchanging the vertical and horizontal addresses and are written in said image memory.

7. An apparatus according to claim 6, further comprising means for subjecting said image data read out of said image memory to chroma correction.

8. An apparatus according to claim 7, further comprising means for subjecting said image data read out of said image memory to gradation correction.

* * * * *